United States Patent [19]

Napadow

[11] 3,749,229
[45] July 31, 1973

[54] METHOD AND APPARATUS FOR PROTECTING CHAIN CONVEYOR
[75] Inventor: Stanley C. Napadow, Chicago, Ill.
[73] Assignee: ILG Industries, Inc., Chicago, Ill.
[22] Filed: Feb. 18, 1971
[21] Appl. No.: 116,433

[52] U.S. Cl. ............................................ 198/177 R
[51] Int. Cl. ................................................ B65 17/20
[58] Field of Search ............................ 222/53, 152; 198/177

[56] References Cited
UNITED STATES PATENTS
3,563,203  2/1971  Stiltner ........................... 198/177 R
FOREIGN PATENTS OR APPLICATIONS
723,734  2/1955  Great Britain .................. 198/177 R Primary Examiner—Evon C. Blunk
Assistant Examiner—Douglas D. Watts
Attorney—Anderson, Luekeka, Even & Tabin

[57] ABSTRACT

A method and apparatus are provided for protecting a length of conveyor chain from contact by undesirable environmental fluids. In accordance with the method of the invention, a length of conveyor chain is surrounded with a non-deleterious fluid at a pressure higher than the pressure of undesirable environmental fluids so as to prevent the undesirable environmental fluids from moving into contct with the chain. An apparatus in accordance with the invention includes an envelope to maintain the non-deleterious fluid in surrounding relation to the conveyor chain.

6 Claims, 6 Drawing Figures

PATENTED JUL 31 1973 3,749,229
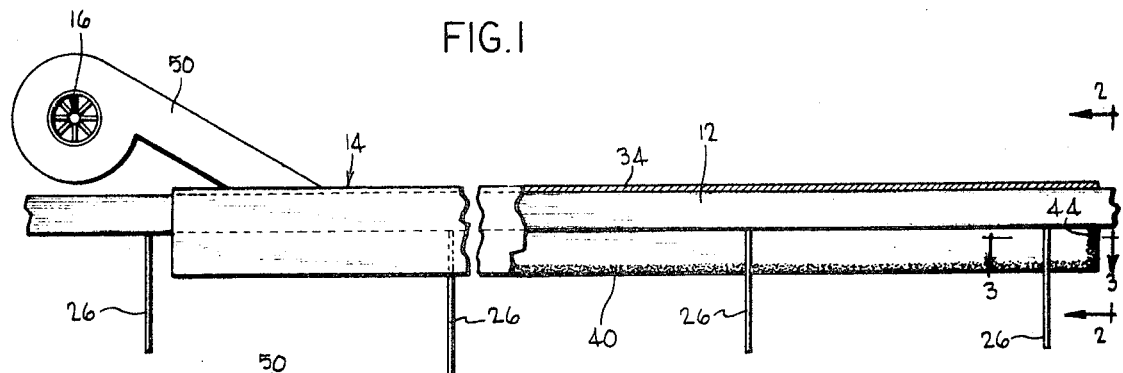
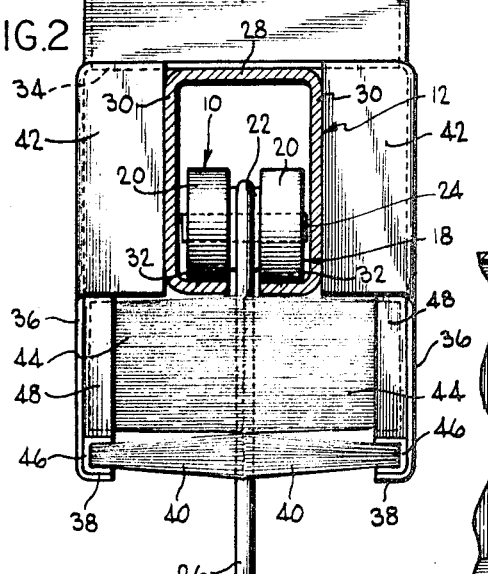
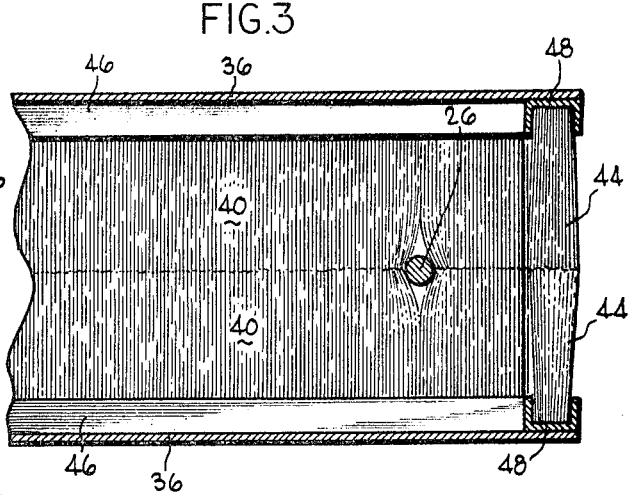
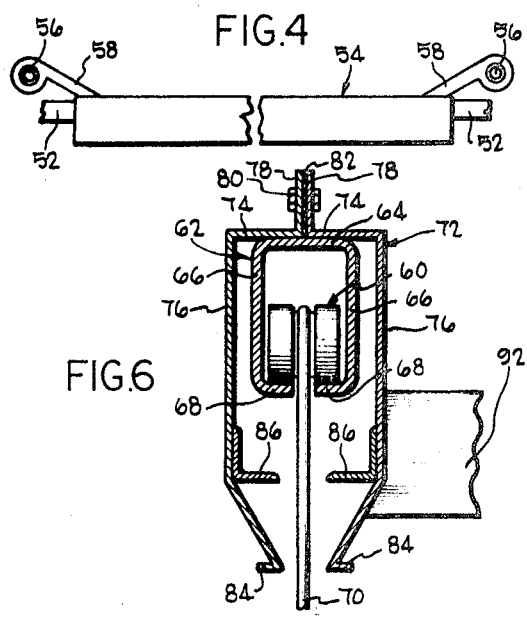
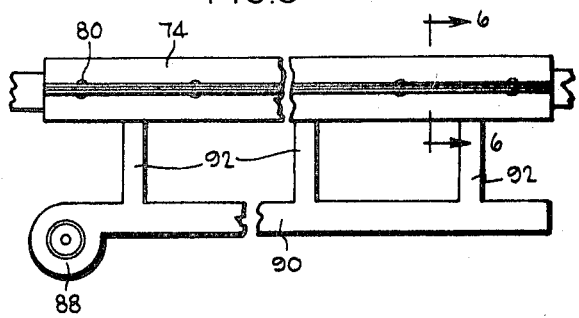
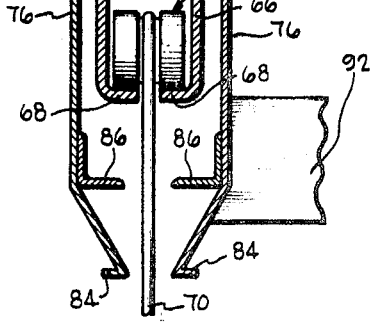
INVENTOR
STANLEY NAPADOW
Anderson, Luedeka, Fitch, Even, & Tabin
ATTYS.

METHOD AND APPARATUS FOR PROTECTING CHAIN CONVEYOR

The present invention relates to conveyors and, more particularly, to methods and apparatus for protecting a conveyor chain from contact by undesirable environmental fluids.

In many industrial plants, it is conventional to transport articles from one area of the plant to another by means of overhead chain conveyors consisting of an endless chain riding in a track or channel and having a plurality of hangers depending from the chain from which the articles to be transported are hung. The chain is generally advanced by means of a motor-driven sprocket conveniently located adjacent the path of the chain.

The conveyor chain conventionally is made up of interconnected units, each of which includes several rollers or the like which ride on the supporting channel. In order for the chain to operate satisfactorily for extended periods of time, it is necessary to maintain the journals or bearings of these rollers properly lubricated. However, environmental conditions frequently make this difficult. For example, in some instances, the chain conveyor is employed to transport articles from a fabricating area to and through a cleaning tunnel and then to paint spray booths. In the cleaning tunnel, the articles are sprayed with a mixture of steam and a caustic solution designed to remove from the articles any oil or grease which might have accumulated on their surfaces during the fabricating process. The tunnel, of course, becomes filled with these caustic vapors or fluids, and if they are permitted to contact the conveyor chain, they remove the lubricant from the journals and bearings of the chain in the same manner that undesirable oils are removed from the surface of the articles. Operation of the conveyor with some of its bearing surfaces in an unlubricated condition causes a stiffening or locking of the unlubricated parts. This places an added burden on the drive motor, which eventually is no longer able to advance the chain and the conveyor must be shut down. Frequently, this causes a number of personnel whose duties depend upon the operation of the conveyor to stand idle while the stiff or locked portions of the chain are manually loosened so as to enable the rollers to again rotate freely.

In an attempt to overcome this problem, efforts have been made to completely enclose the chain within the cleaning chamber. However, these efforts have been thwarted to some extent by the fact that the presence of the hangers which depend from the chain make it impossible for the chain to be completely enclosed adjacent its lower surface. Hence, in the past, the chain has been partially enclosed in a shroud, the lower surface of which is defined by a pair of flexible flaps formed of rubber or similar material which are diverted by the hangers as the hangers pass. This apparatus has not been completely satisfactory, possibly because fluids enter the shroud at the points where the flaps are diverted and the fact that these fluids are then trapped within the shroud by the flaps.

More in an effort to eliminate the affects of the problem rather than the problem itself, a lubricating device has been placed at the exit of the cleaning chamber or tunnel to replace the lubricant removed from the chain while it was within the tunnel. However, invariably some of the lubricant applied at this point tends to drip from the chain onto the articles being transported, thereby re-creating the very condition that the cleaning tunnel was designed to eliminate, and frequently rendering the surface of the articles unsuitable for painting. Location of the lubricating device immediately prior to the tunnel is, of course, not satisfactory since the lubricant would be immediately removed when the chain entered the tunnel, and location of the lubricating device more remotely from the tunnel makes it necessary for the chain to move an extended distance without lubrication with a resulting eventual stiffening or locking of its parts.

In addition to the problems created when the chain passes through a cleaning chamber, similar problems are created when the chain passes through other areas containing deleterious environmental fluids, i.e., gases or vapors which are harmful to the chain. Such gases may include paint encountered in paint spray booths or simply heated air encountered in an oven.

Accordingly, it is the principal object of the present invention to provide an improved method and apparatus for protecting a conveyor chain fron contact by deleterious environmental fluids.

Other objects and advantages of the invention will become apparent with reference to the following description and the accompanying drawing.

In the drawing:

FIG. 1 is a fragmentary, partially broken away side elevational view of an apparatus showing various features of the invention;

FIG. 2 is an enlarged sectional end view taken along line 2—2 of FIG. 1;

FIG. 3 is an enlarged fragmentary sectional plan view taken along line 3—3 of FIG. 1;

FIG. 4 is a fragmentary side elevational view similar to that of FIG. 1 but on a reduced scale, showing an alternate embodiment of the invention as illustrated in FIG. 1;

FIG. 5 is a fragmentary plan view of still another alternate embodiment of the invention; and FIG. 6 is an enlarged fragmentary sectional elevational end view taken along line 6—6 of FIG. 5.

The following description is directed to a method and apparatus for protecting a segment of an overhead chain conveyor of the type which normally comprises a single chain adapted to have attached thereto a plurality of hangers which depend from the chain and from which articles are hung. However, it is to be understood that the invention is equally applicable to the protection of other conveyor chains such as, for example, each of the pair of chains of a conveyor to which an article-supporting belt is attached, or a single conveyor chain which moves in a trough or channel provided in a floor or other supporting surface.

Very generally, in accordance with the methods and apparatus of the embodiment of the present invention as shown in FIGS. 1 through 3, a conveyor chain 10 is carried within a channel 12 enclosed in an envelope 14. A positive fluid pressure is maintained within the envelope to inhibit the passage of environmental fluids into the envelope. In the embodiment of FIGS. 1 through 3, the positive fluid pressure is maintained within the envelope by means of a fan 16 which continuously discharges air into the envelope.

More specifically, and with reference to FIGS. 1 through 3 of the drawing, the conveyor chain 10 is of conventional design and in and of itself forms no part of the present invention. That is, the invention is believed applicable for the protection of any of various forms of conveyor chains. The chain will generally define a closed loop, and the present invention is designed to protect a segment of that loop, i.e., a length of the chain, or the entire chain.

In FIG. 2, the chain is illustrated as including horizontally spaced roller assemblies 18, each of which includes a plurality of horizontally spaced rollers 20 connected for simultaneous rotation about a horizontal axis. The chain 10 includes a succession of interconnected roller assemblies 18, with each assembly having disposed therebetween a guide roller 24 suitably mounted (in a manner not shown) for rotation about a vertical axis. Suspended from the chain 10 are a plurality of connectors or hangers 26 to which the articles to be transported (not shown) are attached. In the illustrated embodiment, the hangers are illustrated with their upper ends looped about the transverse rods 22 of the chain, but they may be attached to the chain in any suitable manner.

Conventionally, and in the illustrated embodiment, the chain is supported by and carried within a channel 12 seen best in FIGS. 1 and 2. The channel 12 includes a top wall 28, side walls 30, and flanges 32 which project inwardly in the direction of each other from the lower edges of the side walls 30. The channel preferably is made of multiple sections of significant length, i.e., ten feet, disposed end to end, with each section being formed from a single piece of metal stock suitably bent, or from an extrusion. Conventionally, suitable brackets or straps (not shown) are provided to suspend or otherwise attach the channel to the ceiling or framework of the building within which the conveyor is located.

The flanges 32 terminate short of each other at the lower end of the channel to provide a longitudinally extending gap between the opposing edges thereof through which the upper portions of the haners 26 may pass. However, the flanges are of sufficient width to provide support for the rollers 20 of the chain, while the rollers 24 located between the roller assemblies 18 are of sufficient diameter to engage the side walls 30 of the channel to center the chain laterally within the channel.

It will be appreciated that the rollers 20 and 24 engage the flanges 32 and side walls 30 of the channel with a rolling contact and that rotatability of the rollers is therefore important to ease of movement of the chain through the channel. Adequate lubrication of the journals of these rollers is therefore essential and a freezing or locking of the rollers, such as would prevent their rotation, creates a sliding, rather than a rolling, contact between the chain and channel, substantially increasing the driving force necessary to move the chain. As a practical matter, when a sufficient number of rollers are no longer capable of rotating, the motor used to advance the chain is no longer able to affect its movement.

The envelope 14 of FIGS. 1 through 3 is preferably formed of sheet metal and includes a top wall 34 and side walls 36. In addition, a flange 38 is provided at the lower end of each side wall 36, and extends laterally inwardly a short distance. The inner edges of the flanges 38 define a slot which extends longitudinally of the envelope along its entire length. The walls 34 and 36 preferably are gas-impervious so that environmental fluids cannot enter the envelope through the top or sides and so that any fluids within the envelope will not escape through these walls, although some minor leakage would be tolerable. Accordingly, any openings which might result from the joining together of adjacent sections of the envelope in end-to-end relationship, or openings which might be formed to accommodate supporting brackets or straps, are preferably sealed in a suitable manner, as by gaskets, soldering, etc.

As previously mentioned, a positive fluid pressure is maintained within the envelope 14 and, in a preferred embodiment, this is accomplished by means of the fan 16 which directs clean air into the envelope. However, in some instances, it may be desirable to inject other fluids into the envelope, such as an inert gas, cool air, air containing a fine mist of lubricant, etc. In the illustrated embodiment of FIGS. 1 through 3, the envelope is partially closed along its lower surface, at the slot defined by the inner edges of the flanges 38, by a seal 40 and at each of its ends by a cap 42 and a seal 44, all of which serve to retain within the envelope the fluid introduced by the fan while still allowing the upper portion of the hangers 26 to enter and leave the envelope.

As seen best in FIG. 2, the seal 40 comprises a multiplicity of relatively stiff threadlike fibers or bristles, one set of which projects inwardly from the lower end of each side wall 36 approximately to a vertical plane containing the longitudinal center line of the chain so as to essentially close the lower end of the envelope along its entire length. The bristles may be formed of natural or artificial fibers. The inner or free ends of each set may either meet at the vertical plane referred to above or each may, if desired, extend slightly past this plane so that the bristles of one set overlap the bristles of the other set.

The seal 40 is not, of course, absolutely fluid-impervious, but it reduces the passage of air outwardly of the envelope to a minimum. The positive pressure within the envelope created by the fan 16 is believed to preclude any environmental fluid, i.e., fluids such as vapors or gases deleterious to the chain 10, from passing into the duct through the seal 40. The seal is also effective to cause the air which does leave the envelope to do so along its length, thereby essentially equalizing the pressure within the envelope. On the other hand, the bristles which comprise the seal are flexed individually by each hanger 26 as it moves longitudinally of the envelope (FIG. 3) so that only a minimal opening is created in the seal by a hanger where it extends through the seal, and each bristle immediately springs back to its original position to close the opening after the hanger has passed out of contact with it.

Each set of bristles which comprises a seal 40 is carried within a strip 46 of U-shaped cross section, and each strip is secured to the side walls 36 of the envelope and rests upon the upper surface of the flange 38.

The cap 42 which forms part of the seal at each end of the enclosure 14 is in the form of a pair of metal plates which extend laterally from the side walls 36 of the envelope to the side walls 30 of the channel 12, and which extend downwardly from the top wall 34 of the envelope to a level even with the lower surface of the flanges 32 of the channel. Metallic plates are suitable for this portion of the ends of the envelope since the hangers 26 do not enter or leave this area and do not engage or come in contact with the plates. If desired, the caps may be formed by offsetting suitable extensions of the side walls 36 of the envelope.

The seals 44 at the ends of the envelope in the illustrated embodiment are also formed of a pair of sets of bristles which extend laterally inwardly from the side walls 36 of the envelope to or slightly past the vertical plane containing the longitudinal center line of the chain. The sets of bristles which form the seals 44 are also carried by U-shaped metallic strips 48 and each set extends downwardly from the lower surface of the flanges 32 of the channel 12 to the upper surface of the seal 40. The seals 44 extend longitudinally of the channel only a short distance, i.e., less than one inch (FIG. 3).

In a preferred embodiment, the fan 16 is supported above the envelope 14 and connected thereto adjacent one end by a duct 50 which conducts clean air from a location remote from the area containing deleterious fluids into the envelope and which is inclined so as to impart to the air a velocity component which is in the direction of the opposite end of the envelope. The introduction of air into the envelope creates a positive air pressure within the envelope, i.e., a pressure above the pressure of the fluids outside the envelope. In some instances, the pressure of the environmental fluids outside the envelope may be greater than atmospheric and the fluid pressure within the envelope should thus be at least as great and preferably greater. The positive air pressure within the envelope in the preferred embodiment results partially from the pressure created by the fan itself and partially from the resistance which the air encounters in moving through the duct, both as a result of skin friction and as a result of the impedance to the flow of air outwardly of the duct by the seals 40 and 44 and the end caps 42. The minimum capacity of the fan employed and the minimum acceptable volume and velocity of air passing outwardly of the envelope through the seals will vary with each specific application depending upon the length of the duct, the nature, tubulence and pressures of the environmental fluids, etc.

In the embodiment of FIGS. 1 through 3, thus described, a positive air pressure is created within the envelope 14 which precludes the passage of fluids into the envelope and into contact with the conveyor chain 10. The seals 40 and 44 and the end cap 42 serve to equalize this pressure throughout the length of the envelope and, in addition, serve as a barrier to the passage of fluids into the envelope. While in some circumstances, the seals 40 and 44 and the end caps 42 in the form disclosed may be sufficient to protect the chain, the presence of a positive air pressure within the envelope provides additional assurance that fluids will not enter the envelope and the combination of the positive air pressure and the seals and end caps is believed to provide adequate and satisfactory protection of the chain under all circumstances.

While in the preferred embodiment, both ends of the envelope 14 are closed by the caps 42 and the seals 44, it is possible to maintain a lesser but still positive pressure within the envelope without these seals and end caps due to the resistance to flow which the air encounters within the duct as a result of skin friction drag. Thus, in some instances, the ends of the envelope may be left open witout adverse affect.

In the embodiment illustrated in FIG. 4, the chain is carried within a channel 52 enclosed in an envelope 54 provided with longitudinal seals and with a cap and end seals at each end in the manner previously described. As opposed to the embodiment of FIGS. 1 through 3, however, where a single fan 16 is provided, the embodiment of FIG. 4 includes a pair of fans 56, each of which is connected to the envelope through a duct 58. One fan 56 is provided adjacent each end of the envelope and the ducts 58 are inclined so as to direct air inwardly of the envelope in the direction of its opposite end. Such an embodiment is useful with particularly long envelopes, or permits the use of two fans of lesser capacity rather than a single fan of high capacity.

In the embodiment illustrated in FIGS. 5 and 6, a chain 60, similar to the chain 10 previously disclosed, is carried within a channel 62 having a top wall 64, side walls 66 and inwardly directed lower flanges 68 defining a gap to accommodate a hanger 70.

The channel 62 is enclosed in an envelope 72 which, in the illustrated embodiment, is formed of a pair of mating sections, each having a top wall portion 74 and a side wall 76. Each top wall portion 74 includes an upwardly directed flange 78 at its outer edge by means of which the sections are joined through the use of suitable fasteners 80. Forming the envelope in two separate sections permits it to be easily assembled around brackets or the like (not shown) by means of which the channel 62 is supported. To render the upper portion of the envelope fluid tight, a gasket 82 may be disposed between the flanges.

The side walls 76 of the envelope 72 extend vertically downwardly from the top wall portion 74. The lower portions of the side walls, constituting about forty percent of their length in a preferred embodiment, taper inwardly toward each other, and then project horizontally outwardly to form a lip 84. The lower edges of the side walls are spaced to define a slot through which the hangers 70 pass. An angle iron 86 is secured to the inner surface of each wall 76 immediately above the bend of the wall where the wall begins to taper. The inner edges of the horizontal flanges of the angle iron are relatively closely spaced to provide a gap therebetween slightly larger than that needed to permit passage of the hangers 70.

A suitable fluid, such as clean air, is introduced into the envelope 72 by means of a fan 88 connected to a manifold duct 90 which extends longitudinally of the envelope in parallel relation thereto and which, in turn, is connected by feeder ducts 92 to the envelope at spaced points along its length. The envelope 72 does not include seals closing the slot at its lower surface or its ends similar to the seals 40 and 44 described with reference to the embodiment of FIGS. 1 through 3. Thus, in contrast to the embodiments of FIGS. 1 through 3, where air is introduced into the envelope at one end and a uniform positive pressure is obtained within the envelope through the use of the aforementioned seals and the end caps 42, in the embodiment of FIGS. 5 and 6, a positive pressure is obtained throughout the envelope by introducing air at various points along its length. It is believed that some of the air which enters at each of the points where the feeder ducts communicate with the envelope is discharged downwardly from the envelope immediately adjacent those points and that a portion of the remaining air is contained above the horizontal flanges of the angle irons 86 by these flanges and travels longitudinally of the envelope in opposite directions and eventually travels downwardly and outwardly of the envelope when it encounters air from an adjacent feeder duct intermediate each pair of ducts. The resistance encountered by the air in travelling longitudinally of the envelope is sufficient to create a positive pressure within the envelope so as to preclude access to the chain by undesirable fluids.

A method and apparatus for protecting a chain conveyor from environmental fluids deleterious to the chain has been disclosed through specific embodiments. However, it should be apparent that various modifications may be made in these embodiments without departing from the scope of the invention. For example, it may be possible in some instances to direct and maintain a positive fluid pressure within the channel within which the chain rides, as by introducing air under pressure directly into the channel. In such a case, it may be possible to dispense with an envelope in any of the forms described and the channel itself in its conventional or in a modified form would then constitute the envelope.

Various of the features of the invention are set forth in the following claims

I claim:

1. For use with a conveyor which includes a conveyor chain having depending connectors connected at upper ends thereof to the chain, an apparatus for protecting a length of the chain from contact by environmental fluids deleterious to the chain, said apparatus comprising:
   - an elongated fluid-impervious stationary envelope surrounding said conveyor chain,
   - said envelope being open at each end to permit continuous movement of the chain through said envelope, said envelope between said open ends protecting a predetermined length of chain, said envelope having walls and having spaced walls in a lower portion of said envelope defining a slot extending longitudinally of said envelope from one end to the other end to accommodate the connectors attached to the chain at upper ends thereof for carrying at their lower ends articles exposed to said environmental fluids, said slot defining walls being spaced from the connectors to define a longitudinally extending open, unsealed gap through which said connectors depend into said environmental fluid, said gap having a width greater than said connectors and allowing the free passage thereof with movement of the chain,
   - means for maintaining within said envelope a non-deleterious fluid under a pressure greater than the pressure of the deleterious environmental fluids surrounding said envelope so as to inhibit the passage of the deleterious environmental fluids into said envelope and into contact with said conveyor chain,
   - fluid barrier means including a flange means projecting inwardly from opposite sides of said envelope to closely adjacent the connectors and dividing said envelope into an upper portion defining with the upper walls of said envelope a first compartment in which the chain travels and into a lower portion with the lower walls of said envelope defining a second compartment at the bottom of which is said slot through which said connectors depend, and
   - means in said upper portion of said envelope for supporting and guiding said conveyor chain for travel longitudinally of said envelope and spaced upwardly of said barrier means, said chain being protected from said environmental fluid by said non-deleterious fluid which is inhibited from free flow downwardly through said slot.

2. An apparatus as set forth in claim 1, wherein means are provided for causing air to continuously flow into said envelope and then outwardly thereof through said longitudinally extending slot.

3. An apparatus as set forth in claim 1, wherein means are provided for causing air to continuously flow into said envelope and then longitudinally of said envelope.

4. An apparatus as set forth in claim 1 wherein said longitudinally extending slot is provided beneath said conveyor chain and is defined by lower converging portions of opposing side walls of said envelope.

5. For use with a conveyor which includes a conveyor chain having depending connectors connected at upper ends thereof to the chain, an apparatus for protecting a length of the chain from contact by environmental fluids deleterious to the chain, said apparatus comprising:
   - an elongated essentially fluid-impervious stationary envelope at least partially surrounding said conveyor chain,
   - said envelope being open at each end to permit continuous movement of the chain through said envelope, and spaced walls in a lower portion of said envelope defining a slot extending longitudinally of said envelope from one end to the other to accommodate the connectors attached to the chain at upper ends thereof for carrying at their lower ends articles exposed to said environmental fluids, said slot defining walls being spaced from the connectors extending through said slot to allow the free passage thereof with movement of the chain,
   - and means for maintaining within said envelope a non-deleterious fluid under a pressure greater than the pressure of the deleterious environmental fluids surrounding said envelope so as to inhibit the passage of the deleterious environmental fluids into said envelope and into contact with said conveyor chain, said means for maintaining a fluid pressure within said envelope including means for continuously filling said envelope with air under pressure at a plurality of spaced locations along the length of said envelope, means within said envelope providing horizontally extending flanges spaced above said slot defining walls and spaced on opposite sides of the connectors to assist in containing the air under pressure in the upper porion of the envelope and reducing its rate of flow through said slot.

6. An apparatus as set forth in claim 5, wherein said means for continuously filling said envelope with air under pressure includes a manifold duct extending longitudinally of said envelope, a fan having a discharge outlet connected to said manifold, and means providing communication between the interior of said manifold and the interior of said envelope at spaced points along the length of said envelope.

* * * * *